US007778715B2

(12) United States Patent
Kirshenbaum et al.

(10) Patent No.: US 7,778,715 B2
(45) Date of Patent: Aug. 17, 2010

(54) METHODS AND SYSTEMS FOR A PREDICTION MODEL

(75) Inventors: Evan Kirshenbaum, Mountain View, CA (US); Dirk M. Beyer, Walnut Creek, CA (US); Henri J. Suermondt, Sunnyvale, CA (US)

(73) Assignee: Hewlett-Packard Development Company, Houston, TX (US)

( * ) Notice: Subject to any disclaimer, the term of this patent is extended or adjusted under 35 U.S.C. 154(b) by 905 days.

(21) Appl. No.: 11/047,093

(22) Filed: Jan. 31, 2005

(65) Prior Publication Data

US 2006/0173559 A1    Aug. 3, 2006

(51) Int. Cl.
*G05B 13/02* (2006.01)
(52) U.S. Cl. .............................. 700/31; 700/28; 700/29; 700/30
(58) Field of Classification Search .................. 700/31, 700/30, 28, 29
See application file for complete search history.

(56) References Cited

U.S. PATENT DOCUMENTS

| 6,128,606 A | 10/2000 | Bengio et al. |
| 6,718,358 B1 | 4/2004 | Bigus et al. |
| 2003/0065409 A1* | 4/2003 | Raeth et al. .................. 700/31 |
| 2005/0096866 A1* | 5/2005 | Shan et al. .................. 702/179 |

OTHER PUBLICATIONS

Shan "A Theoretical Derivation of Relationships between Forecast Errors" Hewlett-Packard Journal, May 1998.*
J. Shan et al.; "Techniques for Monitoring A Data Stream," U.S. Appl. No. 10/698,736, filed Oct. 31, 2003, 57 pp.

* cited by examiner

*Primary Examiner*—Albert DeCady
*Assistant Examiner*—Tejal J Gami (57) ABSTRACT

In at least some embodiments, a method comprises obtaining a state description associated with a system having a component. The method further comprises automatically obtaining a substantially optimal parameterization for the component based on one or more operant characteristics of the component predicted by a behavior prediction model using combinations of the system's state description and a set of possible parameterizations for the component.

30 Claims, 6 Drawing Sheets

METHODS AND SYSTEMS FOR A PREDICTION MODEL

BACKGROUND

Electronic control systems and electronic monitoring systems may be used in any of a variety of applications. For example, any device that functions, at least in part, according to values that change over time may benefit from monitoring the values and adjusting an electronic control system accordingly.

One way to implement electronic control systems and monitoring systems may comprise hard-coding algorithms that are executed, for example, by a processor. However, hard-coded algorithms may not be optimized for a particular implementation of the electrical control system or monitoring system. Even if a user is able to modify parameters that affect an algorithm, a certain amount of expertise may be required to understand how to "tweak" the parameters to improve performance of the algorithm.

There are several dynamic approaches to implement electrical control systems and monitoring systems. For example, some approaches implement adaptive parameterization of a monitoring algorithm. However, the efficiency of adaptive parameterization decreases when a monitoring algorithm uses multiple parameters that are not monotonic or which interact in arbitrary ways.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more parts and may be used to refer to a computer system or a portion of a computer system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described below, embodiments of the invention derive and use behavior prediction models capable of predicting of an operant characteristic of a parameterizable system component based on a state description of a system and a parameterization for the system component. In at least some embodiments, the behavior prediction model permits automatically determining a substantially optimal parameterization of the system component by predicting operant characteristics of the system component using combinations of state descriptions and possible parameterizations. The substantially optimal parameterization is then applied to the system component. In some embodiments, the system component comprises monitoring logic that detects "notable" changes or events in a system based on the substantially optimal parameterization and data received from the system. The monitoring logic may be implemented with hardware, software or a combination of hardware and software.

In some embodiments, multiple behavior prediction models are derived. For example, in such embodiments, each behavior prediction model may be optimized for use with a different system that implements the system component. Therefore, some embodiments select which of multiple behavior prediction models to use. Further, in some embodiments, the task of determining a substantially optimal parameterization of the system component comprises reducing the number of possible parameterizations and implementing a classifier that selects a parameterization from the reduced set of parameterizations.

Figure 1:
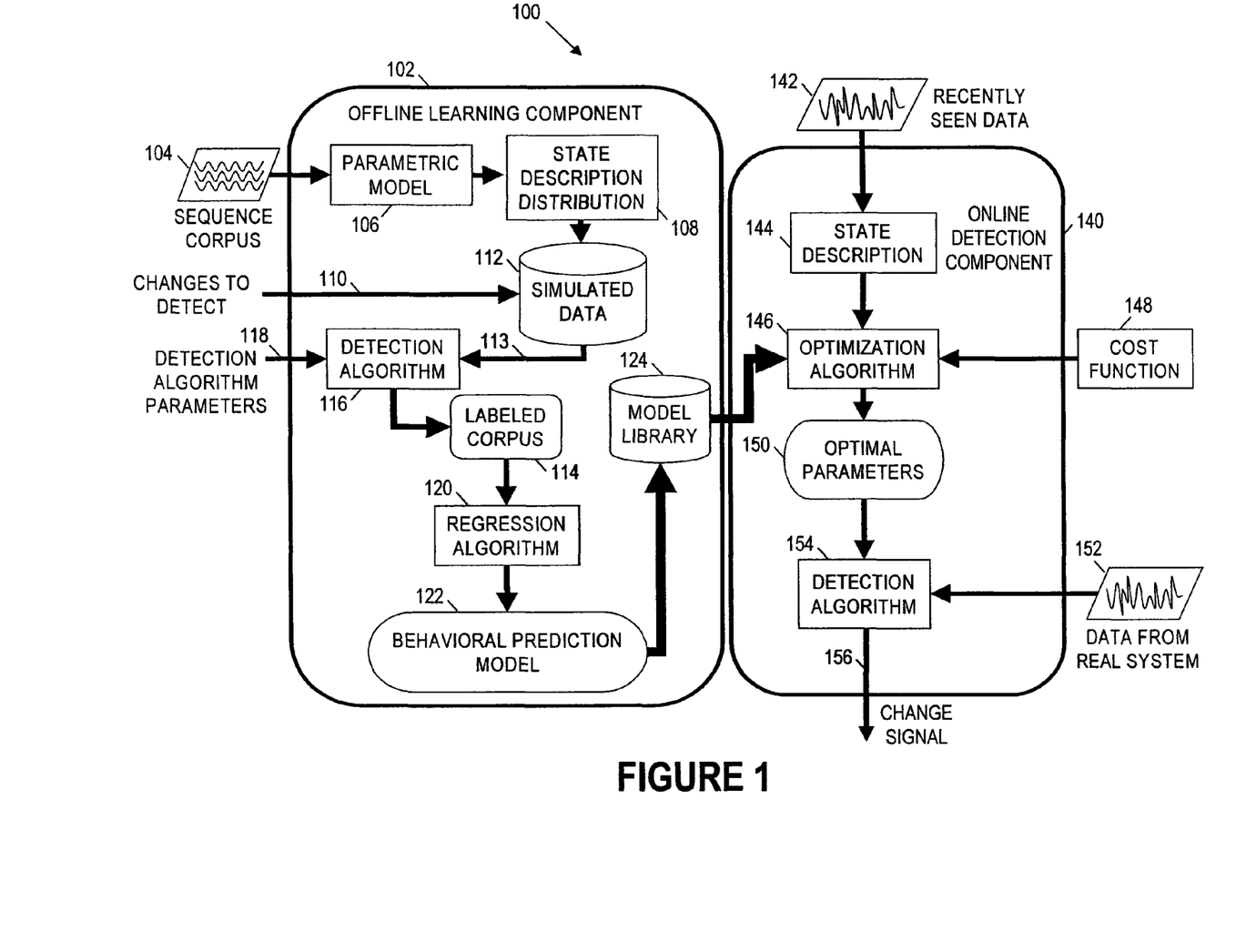
FIG. 1 illustrates one embodiment of a system.

FIG. 1 illustrates one embodiment of a system 100. As shown in FIG. 1, the system 100 comprises an offline learning component 102 that generates and stores one or more behavior prediction models 122 intended to predict operant characteristics of a parameterizable system (simulated or non-simulated) or a parameterizable component of a system. The system 100 also comprises an online detection component 140 that uses one or more of the behavior prediction models 122 to determine a substantially optimal parameterization for the parameterizable system or the component of the system. In the exemplary embodiment of FIG. 1, the behavior prediction models 122 is used to determine a substantially optimal parameterization for a detection algorithm 154. However, other embodiments determine a substantially optimal parameterization for other parameterizable components or systems.

To generate a behavior prediction model 122, the offline learning component 102 makes use of a state description distribution 108, which represents a joint probability distribution over values of the parameters of a parametric model 106. The parametric model 106 provides a way of describing salient current or historical state information about the system that implements the parameterizable component, and, in at least some embodiments, a set of parameters according to the parametric model 106 are considered a state description for the system. If the salient state information relates to recent historical values in a sequence of measured data values, the parametric model 106 is a standard statistical model such as a Gaussian model, in which case the parameters according to the model might be the mean and variance. Other standard statistical models might include an autoregressive model, and ARMA (auto-regressive moving average) model, an ARIMA (auto-regressive integrated moving average) model, a Poisson model, or any other standard model known in the art. In some embodiments, models known in domains other than statistics are used, as are ad hoc models created to describe a particular real system or type of real system being studied.

The state description distribution 108 is therefore thought of as a probability distribution over the set of possible state descriptions. To obtain the state description distribution 108, the offline learning component 102 receives a corpus of data from which state descriptions are derived according to the parametric model 106. In the case in which the state reflects a sequence of values, the data is a corpus of sequences 104 which have been obtained from the parameterizable component or from components like the parameterizable component. State descriptions derived from the corpus of sequences 104 are used to compute the state description distribution 108, and the state description distribution 108 is thought of as an approximation to the likelihood of the system that implements the parameterizable component being in a particular state.

Using the state description distribution 108, a corpus of simulated data 112 is constructed. For each element of the corpus, a state description is drawn from the state description distribution 108 and data is constructed that is compatible with the state description. In some embodiments the state descriptions correspond only to states seen in the corpus of observed data, while in other embodiments they include state descriptions that represent novel states. If the parametric model 106 describes sequences, the construction of the corpus of simulated data 112 comprises generating sequences which when analyzed according to the parametric model 106 would produce state descriptions matching (or nearly matching) those drawn from the state description distribution 108.

In constructing the corpus of simulated data 112, the offline learning component 102 also makes use of additional information that allows it to transform data consistent with a state description drawn from the state description distribution 108 into new data. For example, if the problem is to detect changes in a measured sequence, the information regarding the changes to detect are considered the additional information. As shown, a changes to detect signal 110 is provided so that the simulated data corpus 112 comprises data sequences for which detection is desired as well as data sequences for which detection is not desired.

For example, in some embodiments, the changes to detect signal 110 comprises a statistical distribution of modifications to be made to the parameters of the parametric model 106 contained in a state description drawn from the state description distribution 108. A sequence in the corpus of simulated data 112 represents a sequence that starts out matching an unaltered state description and whose state description suddenly or gradually shifts to one matching the altered state description. Alternatively, in some embodiments, the shift from unaltered to altered reflects a temporarily bimodal distribution increasing the prevalence of the altered distribution. In another embodiment, the construction of the altered sequence comprises adding the values of a new sequence to the values of the unaltered sequence. The new sequence reflects the parametric model 106 or a different model In some embodiments, the corpus of simulated data 112 contains a first set and a second set of data sequences. The first set comprises negative sequences expected in a parameterizable component or system (i.e., sequences of data generated when a system behaves normally). The second set comprises positive sequences that may occur in a parameterizable component or system (i.e., sequences of data generated when an unanticipated or notable event occurs in a system). Associated with each generated sequence in the corpus of simulated data 112 is the state description used to generate it and an indication of whether it is to be considered a positive sequence or a negative sequence. In some embodiments, multiple generated sequences correspond to a single state description.

The simulated data sequences 112 are input to a detection algorithm 116, which attempts to determine whether they are positive sequences or negative sequences. In some embodiments, the detection algorithm 116 is a Holt-Winters algorithm. The behavior of the detection algorithm 116 is controlled by a set of detection algorithm parameters, which are drawn from a distribution of such parameters 118 provided as input to the offline learning component 102. In some embodiments, a new set of detection algorithm parameters is chosen for each simulated data sequence. As the detection algorithm 116 is run, the offline learning component 102 computes operant characteristics of the behavior of the detection algorithm 116 when parameterized with each particular set of detection algorithm parameters and when examining sequences generated starting with each particular state description. In some embodiments, the characteristics noted comprise a false positive rate, an average false positive penetration, a false negative rate, and an average true positive delay.

The false positive rate is expressed as the fraction of cases in which the detection algorithm 116 signaled detection of a positive sequence when examining a negative sequence (described above) of a given fixed length. The average false positive penetration is expressed as the average number of negative points that the detection algorithm 116 observed before mistakenly signaling detection of a positive sequence (given that the detection algorithm 116 signals detection within the fixed length used for the false positive rate described above). The false negative rate is expressed as the fraction of cases in which the detection algorithm 116 failed to signal detection of a positive sequence when examining a positive sequence of a given fixed length. The sequence lengths of the positive sequences and the negative sequences may be the same or may be different. The average true positive delay is expressed as the average number of points that the detection algorithm 116 delayed before correctly signaling detection of a positive sequence. In some embodiments, the determination of each of these operant characteristics requires that the detection algorithm 116 examine multiple positive and/or negative sequences generated from the same sequence state description when parameterized with the same set of detection algorithm parameters.

In some embodiments, the operant characteristics computed include other known measures used to characterize the performance of a binary (or other) classifier. Such measures include accuracy, precision, recall, true negative rate, f-measure, information gain, lift, change in entropy, binormal separation, expected cost due to misclassification, and area under ROC (receiver operating characteristic) curve. Further, in some embodiments, operant characteristics include those relating to the temporal behavior of the detection algorithm 116 (e.g., the expected amount of wall-clock time required to detect a positive) or the amount of system resources (e.g., memory) required by the detection algorithm 116.

The operant characteristics of the detection algorithm 116, along with the detection algorithm parameters and state descriptions that led to them are collected in a labeled corpus 114 which comprises labeled entries relating combinations of state descriptions and sets of detection algorithm parameters to observed operant characteristics.

The regression algorithm 120 accesses the labeled corpus 114 to derive a behavior prediction model 122 based on the entries in the labeled corpus 114. In some embodiments, the regression algorithm 120 comprises a plurality of independently-regressed predictors, each configured to predict a single operant characteristic (e.g., a false positive rate, a false positive penetration, a false negative rate or a true positive delay).

The regression algorithm 120 comprises any algorithm capable of deriving a function from a state description and a set of detection algorithm parameters to one or more operant characteristics. In the preferred embodiment genetic programming is used. Additionally or alternatively, other known method algorithms such as linear regression, logistic regression, linear programming, integer programming, mixed integer programming, genetic algorithms, evolution strategies, and neural networks could be used.

In some embodiments, more than one behavior prediction model 122 is generated by the regression algorithm 120 and stored in the model library 124. For example, in some embodiments, multiple behavior prediction models 122 are generated due to multiple sequence corpora (in addition to the sequence corpus 104) and/or multiple collections of changes to detect (i.e., variance in the changes to detect signal 110). In some embodiments, the multiple sequence corpora and the multiple changes to detect relate to different types of parameterizable components or systems on which the online detection component 140 will be run.

The online detection component 140 of the system 100 accesses the model library 124 and selects a behavior prediction model 122. If there is more than one behavior prediction model 122 stored in the model library 124, the online detection component 140 determines which of the models 122 to use. In some embodiments, the behavior prediction model 122 whose training distribution (e.g., state description distribution 108) most closely matches states observed in the system being monitored or at least one component of the system being monitored In some embodiments, the behavior prediction model 122 is manually selectable. In such embodiments, the behavior prediction models 122 contained in the model library 124 are annotated with a human-interpretable description of the type of system each is considered appropriate for. For example, in some embodiments, the human-interpretable description indicates whether a behavior prediction model 122 is appropriate for standalone systems or for networked systems. Additionally or alternatively, other descriptions such as size of system, anticipated workload, source of data stream, or business domain are used for manually selecting a behavior prediction model 122.

In some embodiments, the data sequences associated with the recently seen data 142 are historical. Alternatively, the data sequences are collected as the online detection component 140 operates (i.e., real-time data analysis). As more data sequences are observed and characterized, a state description 144 associated with the recently seen data 142 may change. Therefore, the online detection component 140 periodically compares state description distributions (i.e., training distributions) associated with behavior prediction models 122 stored in the model library 124 to a current state description 144 associated with the recently seen data 142. In some embodiments, the online detection component 140 selects to use a behavior prediction model 122 whose training distribution most closely matches the current state description 144 associated with the recently seen data 142. In at least some embodiments, the state description 144 is determined based on the parametric model 106.

As shown in FIG. 1, the online detection component 140 comprises an optimization algorithm 146 that receives the state description 144 of the recently seen data 142. The optimization algorithm 146 determines a substantially optimal parameterization 150 for detection algorithm parameters based on the state description 144. In a preferred embodiment, the optimization algorithm 146 holds the state description 144 constant while determining optimal values for the detection algorithm's parameters based on predictions, computed according to the behavior prediction model 122, of operant characteristics of the detection algorithm 154 when it is run on a system whose state is described by the state description 144 and when it is parameterized by various sets of detection algorithm parameters.

In some embodiments, determining the substantially optimal characteristics 150 comprises obtaining a single number associated with each considered set of detection algorithm parameters. To obtain the single number, a cost function 148 is applied to the operant characteristics of the detection algorithm predicted by the behavior prediction model 122. In some embodiments, the cost function 148 comprises a "false positive cost" (i.e., the undesirability that the online detection component 140 falsely identifies a sequence as "positive"). The false positive cost is input as a number value (i.e., the undesirability of each false positive) or as a function (e.g., the undesirability of a number of false positives per time frame) or as a combination of number values and functions. In some embodiments, the cost function 148 also comprises a utility curve (i.e., a mapping algorithm) that relates a delay in detecting an actual event to a cost (i.e., the costliness of each detection delay to a user).

In some embodiments, the utility curve implements one or more threshold delay values to distinguish different costs. For example, in some embodiments, the curve assigns a minimum cost up to a user-selected minimum delay, a maximum cost after a user-selected maximum delay, and a linear interpolation of costs between the minimum delay and the maximum delay.

In at least some embodiments, the selected behavior prediction model 122 estimates the false positive rate, the false positive penetration, the false negative rate, and the true positive delay based on a given set of detection algorithm parameters and the state description 144. In some embodiments, the false positive rate, the false positive penetration and an estimate of an expected frequency of notable events are used to estimate a number of false positives that are expected between two actual events. In such embodiments, the estimated number of expected false positives between two actual events are combined with a user-provided cost for a false positive to derive a cost due to false positives.

Additionally, in some embodiments, the false negative rate and the true positive delay are combined with the user-provided utility curve to derive the cost due to an actual event. Given the state description 144 and the detection algorithm parameters, the optimization algorithm 146 minimizes the combined cost due to false positives and actual events.

For example, in some embodiments, the optimization algorithm 146 minimizes the combined cost by guessing a certain number of sets of detection algorithm parameters and selecting the set of detection algorithm parameters associated with the lowest combined cost. Alternatively, in some embodiments, a "hill climbing" technique is implemented to determine an optimal set of detection algorithm parameters. In a hill climbing technique, a set of detection algorithm parameters is chosen and the combined cost is determined. One or more sets of similar detection algorithm parameters are then generated and the combined costs associated with each set of similar detection algorithm parameters are determined. The process is repeated for a specified amount of time, a specified number of iterations, or until a specified number of iterations have been performed without discovering a set that is associated with a lower combined cost. In alternative embodiments, genetic algorithms, linear programming, closed-form solutions or other techniques are implemented by the optimization algorithm 146 to determine a substantially optimal parameterization 150.

The substantially optimal parameterization 150 is provided to the detection algorithm 154, which monitors data 152 from a system having a parameterizable component. In response to detecting a notable change or notable event in the data 152, the detection algorithm 154 outputs a signal 156. The signal 156 permits a variety of functions. For example, in some embodiments, the signal 156 is input to an alert system configured to provide an audio and/or visual alert to a user of the system being monitored. Additionally or alternatively, the signal 156 may be provided to a logging system configured to log information associated with the notable event or notable change in the data 152. In some embodiments, the signal 156 causes a modification in the behavior of the system being monitored.

For example, in some embodiments, the signal 156 causes the monitored system to perform one or more tasks such as bringing more resources (e.g., disks, processors, people) online, allocating resources to a task, taking resources offline, de-allocating resources from a task, executing a software program, terminating execution of a software program, altering some parameterization of a running software program, instructing a component of the system to take some action, increasing or decreasing the price associated with some service, increasing the level of scrutiny provided by the online detection component 140 or decreasing the level of scrutiny provided by the online detection component 140. In some embodiments, the signal 156 also causes other actions in a system to occur (e.g., turning on a fire sprinkler or locking a door).

Figure 2:
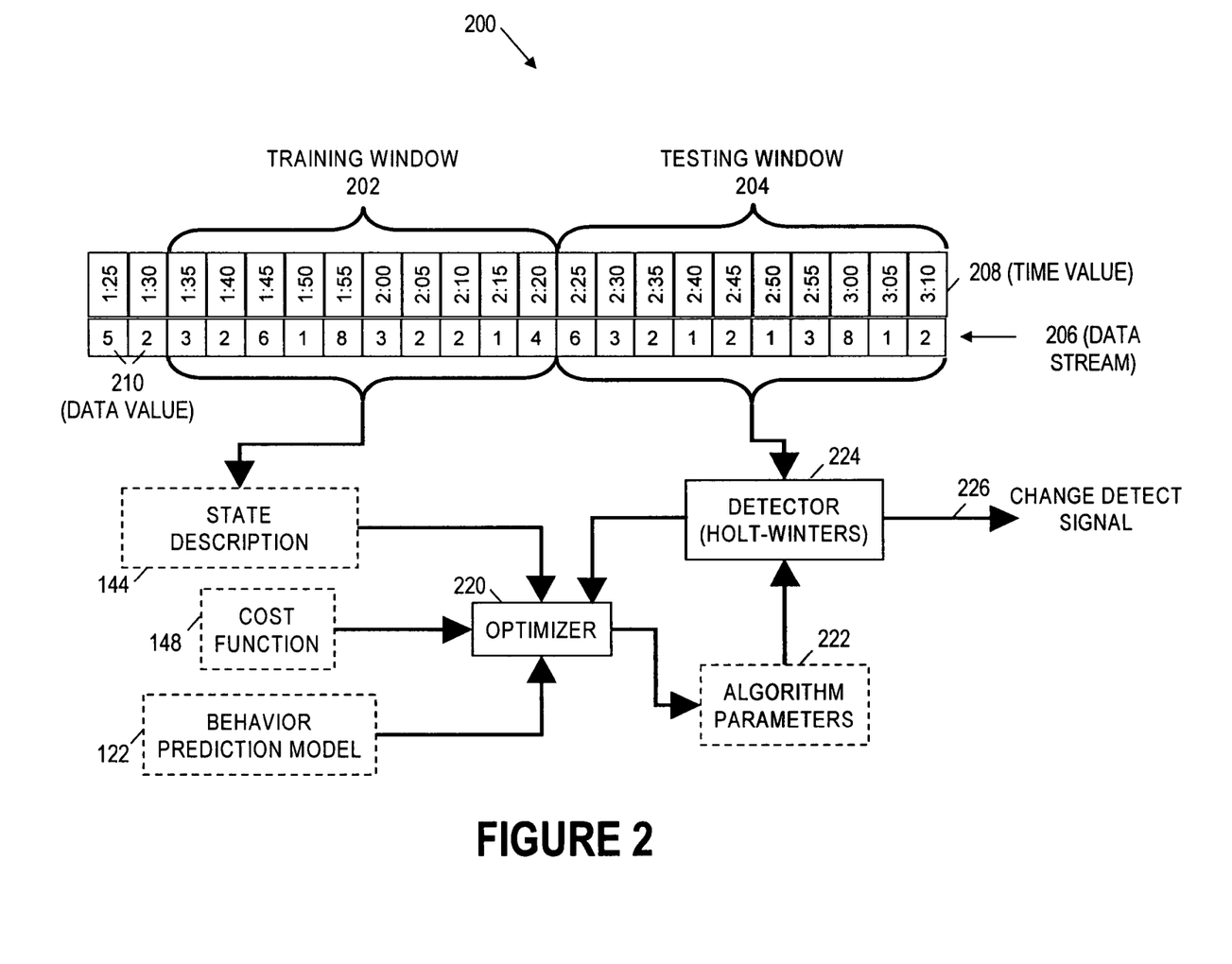
FIG. 2 illustrates one embodiment of an online detection model.

FIG. 2 illustrates one embodiment of an online detection model 200. As shown in FIG. 2, a data stream 206 is divided into a training window 202 and a testing window 204. The data stream 206 comprises a plurality of data values 210. As shown, each data value 210 comprises an associated time value 208. In some embodiments, the training window 202 and the testing window 204 are adjacent (in time) and non-overlapping. In other embodiments, the training window 202 and the testing window 204 overlap (e.g., partially or completely) or are separated from each other by a time gap. The duration of the training window 202 is determined, for example, by hardware buffers or software pointers.

The data associated with the training window 202 is used to compute a state description 144 which is provided to an optimizer 220. As shown, the optimizer 220 also receives input from a cost function 148 that describes the cost (i.e., a quantification of undesirability) associated with incorrect detection or detection delay of one or more "events" by the detector 224. In some embodiments, the cost function 148 implements a cost per occurrence model, a cost per set of occurrences model, a cost of occurrences per time period model, or a combination of models. The optimizer 220 also receives input from a behavior prediction model 122 that predicts operant characteristics of the performance of the detector 224 when the detector 224 is parameterized by a set of parameters. Such operant characteristics comprise the false positive rate, the penetration for a false positive, the false negative rate, and the delay for a true positive described previously.

The optimizer 220 outputs optimized detection algorithm parameter values 222 to the detector 224. The optimized detection algorithm parameter values 222 substantially minimize the expected cost due to incorrect detection or delayed detection by the detector 224 as indicated by the cost function 148. The optimized detection algorithm parameter values 222 are used to configure the detector 224, which receives data from the testing window 204 as input. As the detector 224 receives data from the testing window 204, an interesting or notable change in the data is detectable based on the optimized algorithm parameters 222. When a change in the data is detected, the detector 224 outputs a change detect signal 226. The change detect signal 226 is received by an alert system, a logging system, an analysis system, or some other system configured to use the change detect signal 226.

Figure 3:
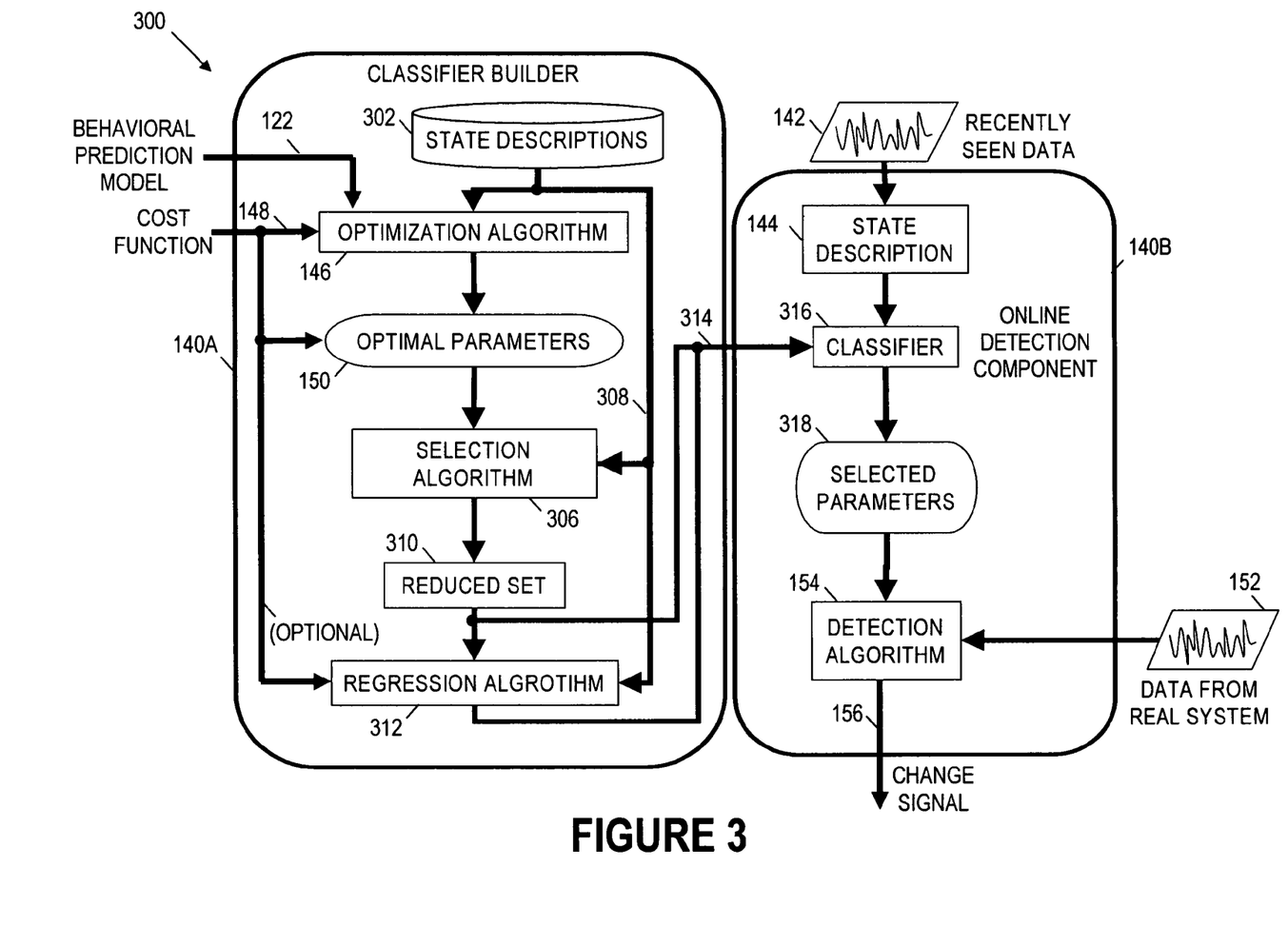
FIG. 3 illustrates one embodiment of another online detection model.

FIG. 3 illustrates one embodiment of another online detection model 300. This detection model 300 is an embodiment of the online detection component 140 of FIG. 1. As shown in FIG. 3, the detection model 300 comprises a classifier builder 140A and an online detection component 140B. The classifier builder 140A comprises an optimization algorithm 146 that determines substantially optimal parameter values 150 based on a behavior prediction model 122, a cost function 148 and a set of state descriptions 302 according to a parametric model (e.g., parametric model 106). The state descriptions 302 describe sequences likely to be seen on the system to be monitored. More generally, the state descriptions 302 describe states likely to be encountered on the system to be monitored. For example, in some embodiments, the state descriptions 302 are obtained from monitoring a system in real-time, from data collected historically on the system or on similar systems, or from a well-known corpus based on systems presumed to be similar.

Additionally or alternatively, in some embodiments, the state descriptions 302 are taken from actually observed sequences or are drawn from a distribution of parameters inferred from observed sequences. The optimization algorithm 148 determines substantially optimal detection algorithm parameter values 150 for some or each of the state descriptions 302.

The state descriptions 302 and their associated substantially optimal parameter values 150 are input, along with the cost function 148 and the behavior prediction model 122, to the selection algorithm 306. The selection algorithm 306 uses the cost function 148 and the behavior prediction model 122 to calculate the cost expected when running the detection algorithm 154 on a system whose state is described by each state description 302 when the detection algorithm 154 is parameterized by the substantially optimal parameter values 150 associated with each other state description 302. In some embodiments, the expected cost calculations are organized and stored in a "cost matrix." Based on one or more expected cost calculations, the selection algorithm 306 determines a reduced set 310 of parameterizations (e.g., a subset of the optimal parameter values 150 associated with each state description 302).

In at least some embodiments, the reduced set 310 of parameterizations comprises an arbitrary number ("k") of parameterizations such that all of the state descriptions 302 are substantially optimized with at least one of the reduced set 310 of parameterizations. In some embodiments, to determine the reduced set 310 of parameterizations a non-pluralistic voting technique is implemented in which each state description 302 is considered a "voter" and each of the substantially optimal parameter values 150 is considered a "candidate."

In the non-pluralistic voting technique each voter fills out a "ballot" that ranks the candidates based on the expected costs stored in the cost matrix. If a voter ranks two candidates identically, the candidates are still be ranked in some canonical order. The candidates that occupy first place positions on at least one ballot are then counted. If there are k first place candidates or less, the first place candidates are selected as the reduced set 310 of parameterizations. Otherwise, one or more first place candidates are removed.

To determine which candidates to remove, the difference between the expected costs of a first place candidate and a second place candidate is calculated for each voter's ballot. For each first place candidate, a score is calculated based on the difference between the first place candidate and one or more second place candidates (each first place candidate may be associated with one or more ballots). This score represents the expected increase in cost should each first place candidate be eliminated and voters are forced to select the second place candidates. The first place candidate with the lowest score (i.e., the one whose removal would result in the lowest expected additional cost) is eliminated. Additionally, in some embodiments, first place candidates that share the same lowest score or that have a score less than a threshold amount are eliminated. If, after the elimination, there are k candidates or less, the reduced set 310 of parameterizations is complete. Otherwise, the same process of eliminating first place candidates with the lowest scores is repeated until k or less first place candidates remain.

While the reduced set 310 of parameterizations is limited to first place candidates in the exemplary embodiment described above, other embodiments are configured to consider other candidates. Additionally or alternatively, in some embodiments, other elimination criteria such as summing the cost difference between the original first place candidate and the current second place candidate for each ballot (rather than summing the cost difference between the current first place candidate and the current second place candidate for each ballot) is used. Also, in some embodiments, one or more voters are eliminated from the process if a determination is made that the one or more voters cause or may cause undesirable candidates to be selected for the reduced set 310 of parameterizations.

In some embodiments (e.g., if a classifier does not already exist), a classifier 316 is then generated using a regression algorithm 312. The classifier 316 accepts as input a state description 302 and selects a parameterization from the reduced set 310 of parameterizations. The regression algorithm 312 attempts to find a classifier 316 that minimizes the expected additional cost due to selecting for a state description 302 a parameterization other than its lowest-cost parameterization in the reduced set 310 of parameterizations. Alternatively, in some embodiments, the regression algorithm 312 maximizes accuracy of choosing the best option for each of the state descriptions 302. In some embodiments, the regression algorithm 312 implements genetic programming, classifier trees, neural networks, support vector machines or other known-method classifier-building techniques to generate the classifier 316.

The classifier 316 of the online component 140B (derived from the regression algorithm 312 or another source) selects a set of parameters from the reduced set 310 of parameterizations based on a state description 144 computed from recently seen data 142 according to a parametric model (e.g., parametric model 106). The detection algorithm 154 is then configured according to the selected parameters 318 and examines data 152 from the monitored system to detect events of interest or changes signaled by the data 152. In response to detecting an event of interest or changes signaled by the data 152, the detection algorithm 154 generates a signal 156. In some embodiments, the signal 156 is used in a variety of ways such as to alert a user of the event or the changes, to activate a logging mechanism, to change behavior of a system being monitored or to cause the system being monitored to perform an action.

Figure 4:
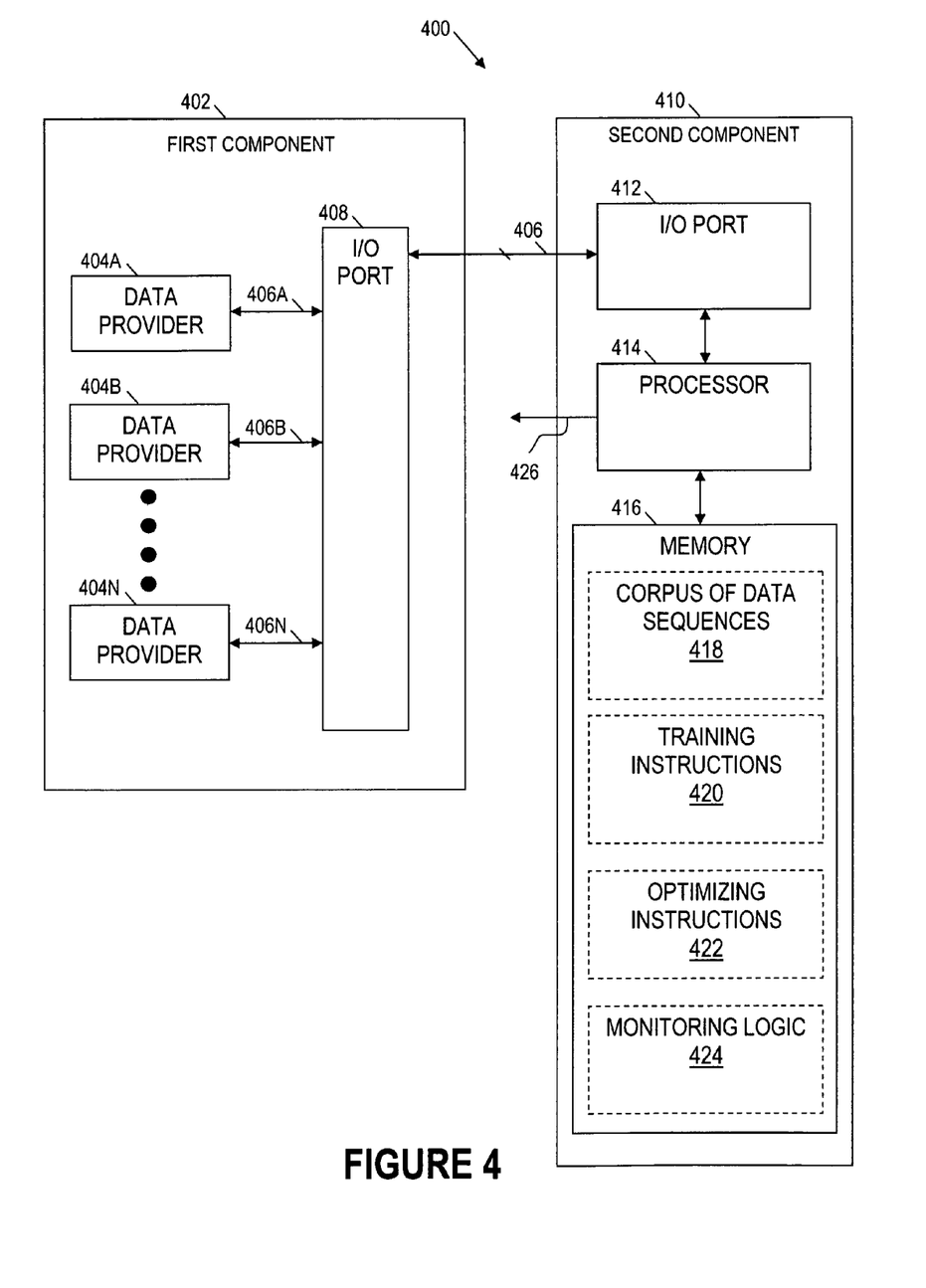
FIG. 4 illustrates one embodiment of another system.

FIG. 4 illustrates one embodiment of another system 400. As shown in FIG. 4, the system 400 comprises a first component 402 that provides data sequences 406 and a second component 410 that monitors the data sequences 406 to detect abnormalities (or data changes of interest) in the data sequences 406. The first component 402 comprises any device or unit that provides data such as a sensor-based device, an integrated circuit, an internal or external computer component, a computer, or a network of computers. As shown, the first component 402 comprises a plurality of parameterizable data providers 404A-404N coupled to an input/output port 408. The parameterizable data providers 404A-404N generate data or data sequences 406A-406N. These data sequences 406A-406N are provided to the second component 410 via the input/output port 408.

The second component 410 comprises a processor 414 coupled to an input/output port 412 and to a memory 416. The memory 416 comprises any permanent or removable storage medium capable of storing computer readable instructions. In at least some embodiments, the processor 414 executes instructions stored in the memory 416 that permit detection of abnormalities in the data sequences 406A-406N. As shown, the memory 416 stores a corpus of data sequences 418, training instructions 420, optimizing instructions 422 and testing instructions 424.

When executed by the processor 414, the training instructions 420 cause the processor 414 to access the corpus of data sequences 418 stored in the memory 416 or in another storage medium accessible to the processor 414. For example, in some embodiments, the corpus of data sequences 418 is provided by a removable storage device or by a remote storage accessible via a network connection. Also, in some embodiments, the corpus of data sequences 418 is received directly from the first component 402 (or another component) and stored in the memory 416 (or other storage medium). In at least some embodiments, the corpus of data sequences 418 comprises data sequences that have existed for more than a predetermined amount of time (i.e., non-current data sequences).

The training instructions 420 cause the processor 414 to parameterize the corpus of data sequences 418 and to store state descriptions derived from the parameterization in the memory 416. For example, in some embodiments, the training instructions 420 generate state descriptions using a parametric model such as the parametric model 106 described for FIG. 1. Also, in some embodiments, the training instructions 420 generate one or more behavior prediction models. Alternatively, in some embodiments, behavior prediction models are available (e.g., generated and provided to the system 400) without executing the training instructions 420.

The behavior prediction models are used by the optimizing instructions 422 to predict operant characteristics of the monitoring logic 424. In at least some embodiments, a behavior prediction model predicts operant characteristics based on a state description and a parameterization associated with the monitoring logic 424.

The optimizing instructions 422 also determine a substantially optimal parameterization for the monitoring logic 424. For example, in some embodiments, the optimizing instructions 422 determine the substantially optimal parameterization for the monitoring logic 424 by minimizing a cost calculated by a cost function based on operant characteristics predicted by a selected behavior prediction model.

If a plurality of behavior prediction models are available, the optimizing instructions 422 select one of the behavior prediction models. In such embodiments, the optimizing instructions 422 may select a behavior prediction model by comparing a state description distribution of the stored data sequences 418 with a state description distribution of the recently seen data sequences 406. Additionally or alternatively, in some embodiments, the optimizing instructions 422 provide an interface that permits a user to manually select one of the behavior prediction models.

If more than a threshold amount of substantially optimal parameterizations exist for the monitoring logic 424, the optimizing instructions 422 may reduce the amount of substantially optimal parameterizations. For example, in some embodiments, the optimizing instructions 422 implements a non-pluralistic voting technique as previously described to reduce the amount of substantially optimal parameterizations.

In at some embodiments, the monitoring logic 424 comprises instructions stored in the memory 416 and executed by the processor 414. Alternatively, the monitoring logic 424 may comprise instructions or hardware implemented separately from the second component 410. In either case, the monitoring logic 424 receives and implements the substantially optimal parameterization with a detection or monitoring algorithm (e.g., the detection algorithm 154) to detect abnormalities (or changes of interest) in data sequences 406 being monitored. If a change of interest is detected, the monitoring logic 424 causes the processor 414 (or a separate processing device) to assert a signal 426 (e.g., the change detect signal 226). In some embodiments, the signal 426 is used, for example, to log information related to the data sequence that caused the signal 426, to alert a user that the change of interest has occurred or to cause a change in the system 400 (e.g., start execution of a program, end execution of a program or reallocate resources).

In at least some embodiments, the training instructions 420, the optimizing instructions 422 and the monitoring logic 424 operate independently. Therefore, in some embodiments, the training instructions 420 are executed once, periodically, or as controlled by a user to provide behavior prediction models. Also, the optimizing instructions 422 are executed periodically or as controlled by a user to update the substantially optimal parameterizations implemented by the monitoring logic 424. The monitoring logic 424 monitors simulated or non-simulated data sequences 406 in real time based on the substantially optimal parameterization provided by the optimizing instructions 422 as previously described.

Although the first component 402 and the second component 410 are shown as separate, in some embodiments, the first component 402 is part of a computer that houses the second component 410. Alternatively, in some embodiments, the first component 402 and the second component 410 are positioned far away from each other and are coupled to each other via a network. In such embodiments, the I/O port 408 and the I/O port 412 comprise network ports that allow the transfer of data from the first component 402 to the second component 410 across large distances. Also, the data sequences 418, the training instructions 420, the optimizing instructions, 422 and the monitoring logic 424 may be implemented in separate computing devices and are not necessarily stored and executed by a single computing device. Thus, one computing device may generate a behavior prediction model and another computing device may use the behavior prediction model to determine a substantially optimal parameterization of monitoring logic that monitors data to detect changes of interest in the data or abnormal data. Additionally, some embodiments of the invention implement wireless communication techniques that permit the components of the system 400 to communicate wirelessly.

Figure 5:
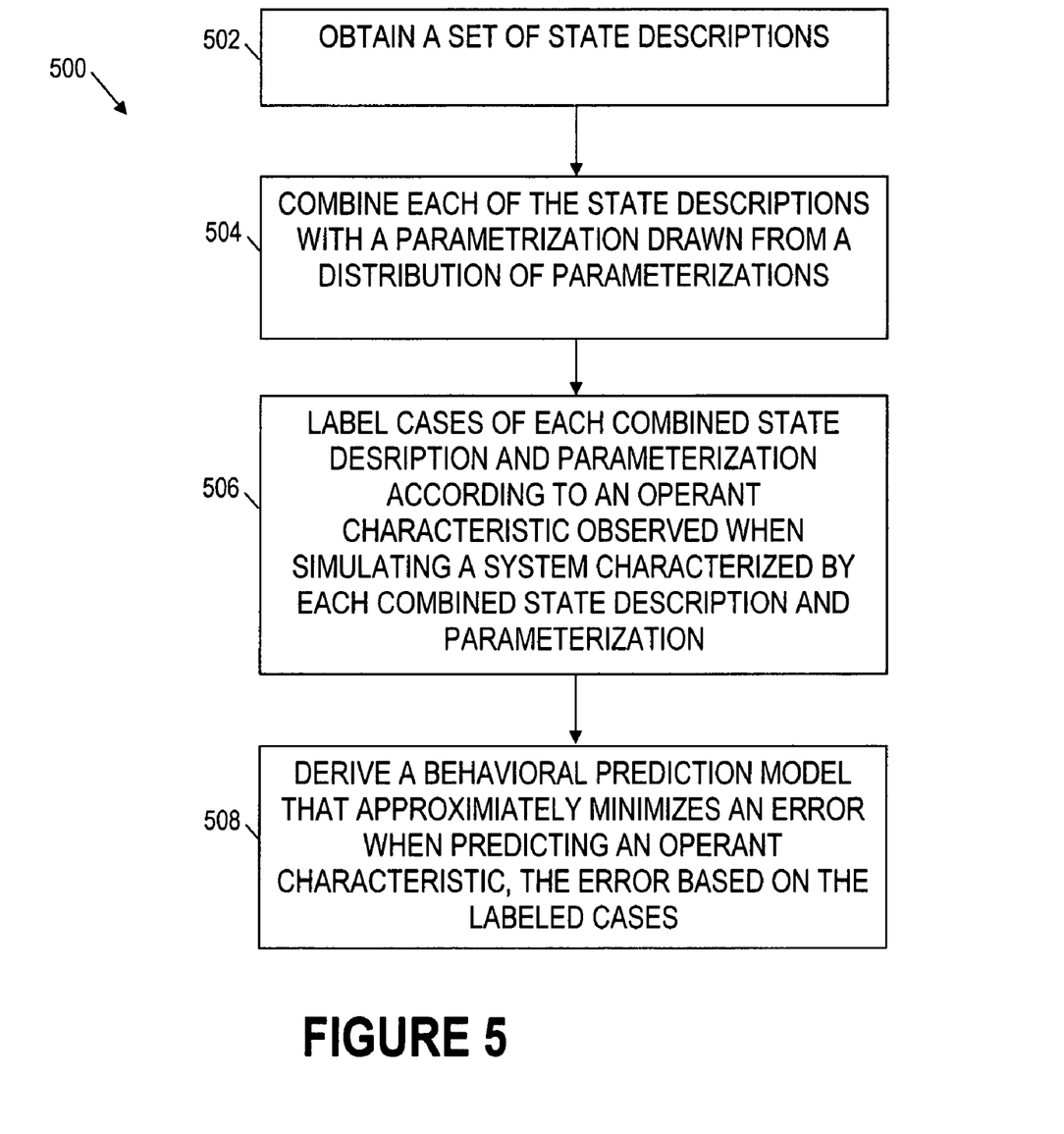
FIG. 5 illustrates one embodiments of a method.
Figure 6:
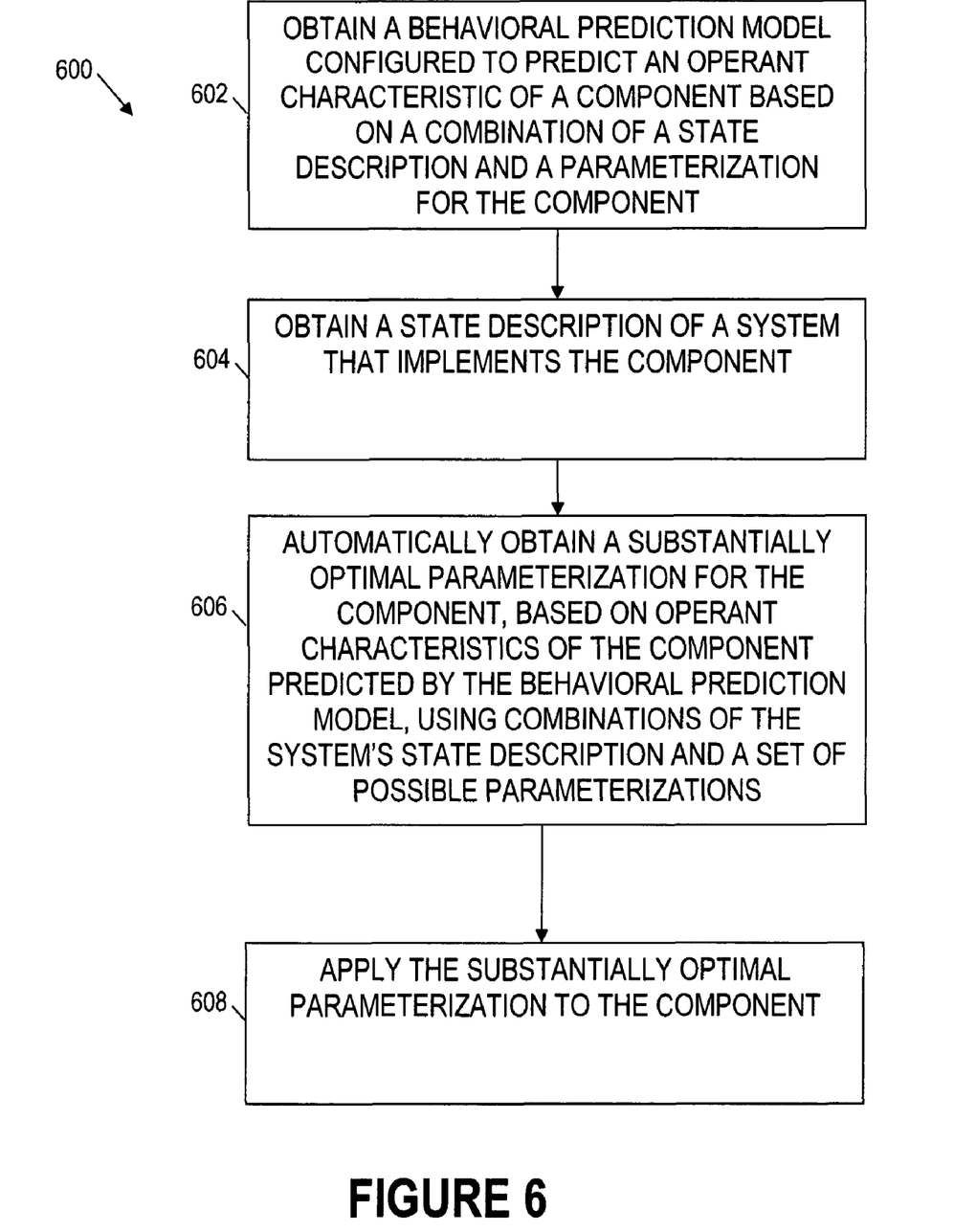
FIG. 6 illustrates one embodiment of another method.

FIG. 5 illustrates one embodiment of a method 500. As shown in FIG. 5, the method 500 comprises obtaining a set of state descriptions (block 502). Each state description describes a state (e.g., an operational state) of a system at a particular time. The state description comprises, for example, statistical parameters such as a mean and a standard deviation. At block 504, each of the state descriptions is combined with a parameterization drawn from a distribution of parameterizations. The parameterizations are associated with the system or a component of the system. At block 506, cases (i.e., instances) of each combined state description and parameterization are labeled according to an operant characteristic observed when simulating a system characterized each combined state description and parameterization. The method 500 then derives a behavior prediction model that approximately minimizes an error when predicting an operant characteristic, the error based on the labeled cases (block 508). In some embodiments, behavior prediction model comprises a mathematical model. Therefore, in some embodiments, approximately minimizing the error when predicting an operant characteristic comprises finding an optimal solution for the mathematical model using a technique such as linear programming, integer programming or mixed integer programming FIG. 6 illustrates one embodiment of another method 600. As shown in FIG. 6, the method 600 comprises obtaining a behavior prediction model configured to predict an operant characteristic of a component based on a combination of a state description and a parameterization for the component (block 602). At block 604, a state description of a system that implements the component is obtained. At block 606, a substantially optimal parameterization for the component, based on the operant characteristics of the component predicted by the behavior prediction model is automatically obtained. The substantially optimal parameterization is obtained using combinations of the system's state description and a set of possible parameterizations. The method 600 then applies the substantially optimal parameterization to the component (block 608).

The above discussion is meant to be illustrative of the principles and various embodiments of the present invention. Numerous variations and modifications will become apparent to those skilled in the art once the above disclosure is fully appreciated. For example, the components described in FIG. 1 may be implemented in hardware, software, or a combination of hardware and software. It is intended that the following claims be interpreted to embrace all such variations and modifications.

What is claimed is:

1. A method, comprising:
   obtaining, by a processor, a state description associated with a system having a component including at least hardware; and
   automatically obtaining, by the processor, a substantially optimal parameterization for the component based on one or more operant characteristics of the component predicted by a behavior prediction model using combinations of the system's state description and a set of possible parameterizations for the component; and
   using the substantially optimal parameterization to control the component.

2. The method of claim 1 further comprising obtaining a behavior prediction model configured to predict operant characteristics of a component based on a combination of a state description and a parameterization for the component.

3. The method of claim 1 further comprising applying the substantially optimal parameterization to the component.

4. The method of claim 1 wherein the component comprises monitoring logic and the operant characteristics relate to a future behavior of the monitoring logic.

5. The method of claim 4 wherein the system's state description comprises a characterization of a previously observed sequence of data provided by the system.

6. The method of claim 5 further comprising identifying within a data stream a training window and a testing window, wherein the characterization of the previously observed sequence of data comprises the training window and the future behavior of the monitoring logic comprises the behavior of the monitoring logic when provided with the testing window as input.

7. The method of claim 1 further comprising obtaining a set of state descriptions, wherein obtaining the behavior prediction model further comprises selecting the behavior prediction model from a set of behavior prediction models based on the set of state descriptions.

8. The method of claim 1 wherein automatically obtaining the substantially optimal parameterization comprises using the behavior prediction model to associate with substantially each of a plurality of the set of possible parameterizations a predicted operant characteristic and selecting the substantially optimal parameterization based on an associated predicted operant characteristic.

9. The method of claim 8 wherein selecting the substantially optimal parameterization comprises associating with an operant characteristic an expected cost computed according to a cost function.

10. The method of claim 1 wherein the set of possible parameterizations comprises a reduced set of possible parameterizations.

11. The method of claim 1 wherein automatically obtaining a substantially optimal parameterization comprises selecting a parameterization indicated by a classifier associated with the behavior prediction model based on the state description.

12. A system, comprising:
a storage medium to store one or more behavior prediction models configured to predict operant characteristics of a parameterizable component based on a combination of a state description and a parameterization for the component that includes at least hardware; and
a processor coupled to the storage medium, the processor to execute an optimization algorithm configured to receive a behavior prediction model and to automatically determine a substantially optimal parameterization for the component based on one or more operant characteristics of the component predicted by the received behavior prediction model using combinations of a state description associated with the component and a set of possible parameterizations for the component.

13. The system of claim 12 wherein the received behavior prediction model is selected by comparing a parameter distribution of recently seen data sequences associated with the component with parameter distributions used to train the one or more behavior prediction models stored in the storage medium.

14. The system of claim 13 wherein the parameter distribution of recently seen data sequences varies over time and wherein the optimization algorithm is configured to implement a behavior prediction model trained using a parameter distribution that most closely matches a current parameter distribution of recently seen data.

15. The system of claim 12 wherein the received behavior prediction model is selected manually by a user.

16. The system of claim 12 wherein the optimization algorithm automatically determines a substantially optimal parameterization for the component by holding parameters based on a parametric model constant while varying detection algorithm parameters associated with the component.

17. The system of claim 12 wherein the optimization algorithm applies a cost function to the behavior prediction model, the cost function measures a cost of incorrectly identifying a notable data sequence associated with the component.

18. The system of claim 12 wherein the optimization algorithm applies a cost function to the behavior prediction model, the cost function measures a cost of delay in detecting a notable data sequence associated with the component.

19. The system of claim 12 wherein the optimization algorithm is configured to automatically determine a plurality of substantially optimal parameterizations.

20. A system, comprising:
a storage medium to store one or more behavior prediction models configured to predict operant characteristics of a parameterizable component based on a combination of a state description and a parameterization for the component that includes at least hardware;
a processor coupled to the storage medium, the processor to execute an optimization algorithm configured to receive a behavior prediction model and to automatically determine a substantially optimal parameterization for the component based on one or more operant characteristics of the component predicted by the received behavior prediction model using combinations of a state description associated with the component and a set of possible parameterizations for the component,
wherein the optimization algorithm is configured to automatically determine a plurality of substantially optimal parameterizations; and
a selection algorithm that determines a reduced set of substantially optimal parameterizations based on an expected cost of implementing each substantially optimal parameterization.

21. The system of claim 20 further comprising a classifier that selects a substantially optimal parameterization from the reduced set based on a parametric distribution of recently seen data associated with the component.

22. A computer-readable medium that stores instructions, where the instructions, when executed, cause at least one processor to:
derive a behavior prediction model configured to predict operant characteristics using a state description and a parameterization;
automatically generate a substantially optimal parameterization for a component coupled to the computer based on one or more operant characteristics of the component predicted by the behavior prediction model using combinations of a state description associated with the component and a set of possible parameterizations for the component; and
apply the substantially optimal parameterization to the component.

23. The computer-readable medium of claim 22, where the instructions, when executed, cause at least one processor to periodically implement a different behavior prediction model.

24. A computer system, comprising:
a processor to:
   derive at least one behavior prediction model configured to predict operant characteristics using a state description and a parameterization; and
   automatically generate a substantially optimal parameterization for a component based on one or more operant characteristics of the component predicted by the behavior prediction model using combinations of a state description associated with the component and a set of possible parameterizations for the component, wherein the component includes at least hardware; and
   use the substantially optimal parameterization to control the component.

25. The method of claim 4, further comprising:
the monitoring logic monitoring input data to detect a change in the data; and
the monitoring logic outputting an indication of the change.

26. The system of claim 12, wherein the component includes a monitoring logic that monitors input data to detect a change in the input data and to output an indication of the change.

27. The computer-readable medium of claim 22, wherein the component includes a monitoring logic that monitors input data to detect a change in the input data and to output an indication of the change.

28. The system of claim 24, wherein the component includes a monitoring logic that monitors input data to detect a change in the input data and to output an indication of the change.

29. The system of claim 12, wherein the substantially optimal parameterization is used to control the component.

30. The computer-readable medium of claim 22, wherein the substantially optimal parameterization is used to control the component.

* * * * *